(12) United States Patent
Imoto et al.

(10) Patent No.: US 9,554,044 B2
(45) Date of Patent: Jan. 24, 2017

(54) IMAGE QUALITY ADJUSTMENT APPARATUS, CORRECTION DATA GENERATION METHOD, AND IMAGE QUALITY ADJUSTMENT TECHNIQUE USING THE APPARATUS AND METHOD

(71) Applicant: IIX INC., Tokyo (JP)

(72) Inventors: Masayoshi Imoto, Tokyo (JP); Hiroshi Murase, Tokyo (JP); Shinya Tabata, Tokyo (JP)

(73) Assignee: IIX INC., Tokyo (JP)

( * ) Notice: Subject to any disclaimer, the term of this patent is extended or adjusted under 35 U.S.C. 154(b) by 0 days.

(21) Appl. No.: 14/430,883

(22) PCT Filed: Jun. 11, 2013

(86) PCT No.: PCT/JP2013/066068
§ 371 (c)(1),
(2) Date: Mar. 24, 2015

(87) PCT Pub. No.: WO2014/050222
PCT Pub. Date: Apr. 3, 2014

(65) Prior Publication Data
US 2015/0271409 A1    Sep. 24, 2015

(30) Foreign Application Priority Data

Sep. 25, 2012    (JP) .................................. 2012-211226

(51) Int. Cl.
*G09G 3/00*    (2006.01)
*G09G 3/20*    (2006.01)
(Continued)

(52) U.S. Cl.
CPC .......... *H04N 5/23264* (2013.01); *G09G 3/006* (2013.01); *G09G 3/20* (2013.01);
(Continued)

(58) Field of Classification Search
CPC combination set(s) only.
See application file for complete search history.

(56) References Cited

U.S. PATENT DOCUMENTS

2007/0285537 A1*  12/2007  Dwinell ................. G06T 7/001
                                                        348/263
2008/0063254 A1*   3/2008  Tanizaki ............... G06T 7/0004
                                                        382/141

(Continued)

FOREIGN PATENT DOCUMENTS

| JP | 2008011334 A | 1/2008 |
| JP | 2010057149 A | 3/2010 |
| JP | 2012085225 A | 4/2012 |

OTHER PUBLICATIONS

ISA Japanese Patent Office, International Search Report Issued in Patent Application No. PCT/JP2013/066068, Jul. 30, 2013, WIPO, 2 pages.

(Continued)

*Primary Examiner* — Wesner Sajous
(74) *Attorney, Agent, or Firm* — Alleman Hall McCoy Russell & Tuttle LLP (57) ABSTRACT

An image quality adjustment apparatus obtains correction data for correcting display unevenness of a display panel by capturing an image of the display panel using a camera, and includes a moire frequency control unit that performs a control to position the display panel and the camera at a predetermined relative angle with respect to each other, an unevenness measurement unit that measures the display unevenness of the display panel based on the image captured by the camera, and a correction data generation unit that generates the correction data based on the unevenness measured by the unevenness measurement unit. Arranging the panel and the camera at the predetermined relative angle shifts a spatial frequency component of a moire pattern (Continued)

occurring in the image captured by the camera out of a region where a spatial frequency component of the display unevenness is present, and removes an influence of the moire pattern.

18 Claims, 8 Drawing Sheets

(51) Int. Cl.
    *G09G 5/02*     (2006.01)
    *H04N 5/232*     (2006.01)
    *H04N 5/341*     (2011.01)
    *H04N 5/357*     (2011.01)
    *H04N 17/04*     (2006.01)
    *H04N 9/64*     (2006.01)
    *H04N 17/00*     (2006.01)
    *H04N 5/372*     (2011.01)
(52) U.S. Cl.
    CPC ............... *G09G 5/02* (2013.01); *H04N 5/341* (2013.01); *H04N 5/357* (2013.01); *H04N 5/372* (2013.01); *H04N 17/004* (2013.01); *G09G 2320/0233* (2013.01); *G09G 2320/0285* (2013.01); *G09G 2320/0693* (2013.01); *G09G 2360/145* (2013.01)

(56) References Cited

U.S. PATENT DOCUMENTS

2008/0246781 A1* 10/2008 Surati ...................... H04N 5/74
                                                     345/690
2010/0033680 A1* 2/2010 Krijn ................. G02B 27/2214
                                                      353/8

OTHER PUBLICATIONS

ISA Japanese Patent Office, Written Opinion Issued in Patent Application No. PCT/JP2013/066068, Jul. 30, 2013, WIPO, 7 pages.

* cited by examiner

IMAGE QUALITY ADJUSTMENT APPARATUS, CORRECTION DATA GENERATION METHOD, AND IMAGE QUALITY ADJUSTMENT TECHNIQUE USING THE APPARATUS AND METHOD

BACKGROUND OF THE INVENTION

Field of the Invention

The present invention relates to an image quality adjustment apparatus and correction data generation method for generating correction data for correcting display unevenness caused by manufacturing variations, and an image quality adjustment technique using the apparatus and method.

Description of the Related Art

It is known that display unevenness occurs in display panels, such as liquid crystal panels, organic EL panels, and the like, due to manufacturing variation. For example, in the case of liquid crystal panels, it is known that display unevenness occurs due to uneven cell gaps or uneven illumination of the backlight. In the case of organic EL panels, it is known that display unevenness occurs due to uneven illumination of light emitting devices included in respective pixels. In order to provide consumers with a high-quality display panel with reduced display unevenness, an image quality adjustment apparatus is used to measure display unevenness (unevenness data) in advance in the production line, and based on the measured unevenness data, generate correction data. The generated correction data is written to a ROM of a correction circuit incorporated in the display panel. When the display panel is driven according to display data, the correction circuit reads out the correction data, and based on the correction data, corrects the display data, depending on the display panel, so that an image free from display unevenness can be displayed.

In measurement of display unevenness, a predetermined test pattern image is displayed on a display panel, and an image of the displayed test pattern image is then captured using a camera including a CCD (CCD camera). However, the pixels of a display panel and the pixels of the CCD of a CCD camera are arranged in a regular grid pattern, and therefore, unless both of the arrangements completely match, a moire pattern occurs. If correction data is calculated based on a captured image containing a moire pattern, display unevenness cannot be accurately corrected, which is a problem.

SUMMARY OF THE INVENTION

Therefore, the present inventors have proposed a technique of calculating appropriate correction data without the influence of a moire pattern by obtaining measurement data while reducing the occurrence of a moire pattern by, for example, rotating a CCD camera around an axis perpendicular to a display panel (JP 2012-85225A).

The above technique is provided to reduce the strength of a moire pattern itself. However, the further study conducted by the present inventors has shown that, in some cases, the strength of a moire pattern cannot be sufficiently reduced even when the CCD camera is rotated.

The present inventors have further studied to find that this is because a spatial aliasing distortion of second and third harmonics of a spatial frequency region of moire patterns overlaps a spatial frequency region of images (unevenness). Therefore, it has been necessary to develop a technique of removing interference between an image having display unevenness and a moire pattern instead of the above technique of reducing the moire strength itself.

The present inventors have found that it is effective and practical to change a relative angle between a camera and a panel and thereby shift the spatial frequency (including aliasing distortion) of a moire pattern out of or within the spatial frequency region of an image (unevenness), instead of reducing the moire strength itself. The present invention has been made based on this finding.

The present invention has been made with the above conventional problems in mind. It is an object of the present invention to provide an image quality adjustment apparatus and correction data generation method that can accurately generate correction data for correcting unevenness without the influence of a moire pattern, and an image quality adjustment technique using the apparatus and method.

To achieve the object, an image quality adjustment apparatus according to an embodiment of the present invention for obtaining correction data for correcting display unevenness of a display panel by capturing an image of the display panel using a camera includes a test pattern signal control unit configured to generate a test pattern signal for causing the display panel to display a test pattern image, a relative position control unit configured to perform a control so that the display panel and the camera are positioned at a predetermined relative angle with respect to each other, an unevenness measurement unit configured to measure the display unevenness of the display panel based on image data captured by the camera, and a correction data generation unit configured to generate correction data for correcting the display unevenness of the display panel based on the display unevenness measured by the unevenness measurement unit. When an image of the test pattern image displayed on the display panel is captured by the camera, the display panel and the camera are arranged at a predetermined relative angle with respect to each other so that a spatial frequency component of a moire pattern occurring in the captured image is shifted out of a region where a spatial frequency component of the display unevenness is present, and an influence of the spatial frequency component of the moire pattern is thereby removed.

In the above embodiment, the relative position control unit preferably sets a relative distance between the display panel and the camera to a predetermined value.

In the above embodiment, the predetermined relative angle is preferably substantially equal to arcsin 0.5P, where P is a value obtained by dividing a pixel pitch of the display panel imaged on pixels of the camera by a pixel pitch of the camera.

In the above embodiment, the image quality adjustment apparatus preferably further includes a low-pass filter configured to remove a high frequency component of the image captured by the camera. The spatial frequency component of the moire pattern is preferably removed by the low-pass filter.

In the above embodiment, the low-pass filter is preferably set to pass a frequency component of a region in which the display unevenness is present.

In the above embodiment, an f-number of the lens of the camera is preferably set to be greater than or equal to $1.2\ p/\lambda$ so that the spatial frequency component of the moire pattern is removed, where p represents the pixel pitch of the display panel imaged on pixels of the camera, and $\lambda$ represents a wavelength of light incident to the camera.

A method according to another embodiment of the present invention for obtaining correction data for correcting display unevenness of a display panel by capturing an image of the display panel using a camera, includes a test pattern image display step of causing the display panel to display a test pattern image, a test pattern image capture step of capturing an image of the test pattern image displayed in the test pattern image display step using a camera positioned at a predetermined relative angle with respect to the display panel, an unevenness measurement step of measuring the display unevenness of the display panel based on the image of the test pattern image captured in the test pattern image capture step, and a correction data generation step of generating the correction data for correcting the display unevenness of the display panel based on the display unevenness measured in the unevenness measurement step. The predetermined relative angle is set so that a spatial frequency component of a moire pattern occurring in the captured image is shifted out of a region where a spatial frequency component of the display unevenness is present, and an influence of the spatial frequency component of the moire pattern is thereby removed.

In the above embodiment, in the test pattern image capture step, a relative distance between the display panel and the camera is preferably set to a predetermined value.

In the above embodiment, the predetermined relative angle is preferably substantially equal to arcsin 0.5P, where P is a value obtained by dividing a pixel pitch of the display panel imaged on pixels of the camera by a pixel pitch of the camera.

In the above embodiment, the display unevenness of the display panel is preferably measured in the unevenness measurement step after the spatial frequency component of the moire pattern in the captured image is removed using a low-pass filter.

In the above embodiment, the low-pass filter is preferably set to pass a frequency component in a region where the display unevenness is present.

In the above embodiment, an f-number of the lens of the camera is preferably set to be greater than or equal to 1.2 p/λ, where p represents the pixel pitch of the display panel imaged on pixels of the camera, and λ represents a wavelength of light incident to the camera.

A method according to another embodiment of the present invention for producing an image quality adjustment type display panel including a display panel and an image quality adjustment circuit including a storage unit for storing correction data for correcting display unevenness of the display panel, includes a test pattern image display step of causing the display panel to display a test pattern image, a test pattern image capture step of capturing an image of the test pattern image displayed in the test pattern image display step using a camera positioned at a predetermined relative angle with respect to the display panel, an unevenness measurement step of measuring the display unevenness of the display panel based on the image of the test pattern image captured in the test pattern image capture step, a correction data generation step of generating the correction data for correcting the display unevenness of the display panel based on the display unevenness measured in the unevenness measurement step, a correction data storage step of storing the correction data generated in the correction data generation step to the storage unit, and an image quality adjustment circuit incorporation step of incorporating the image quality adjustment circuit into the display panel so that the image quality adjustment circuit corrects an input signal to the display panel based on the correction data stored in the storage unit so as to correct the display unevenness of the display panel. The predetermined relative angle is set so that a spatial frequency component of a moire pattern occurring in the captured image is shifted out of a region where a spatial frequency component of the display unevenness is present, and an influence of the spatial frequency component of the moire pattern is thereby removed.

In the above embodiment, in the test pattern image capture step, a relative distance between the display panel and the camera is preferably set to a predetermined value.

In the above embodiment, the predetermined relative angle is preferably substantially equal to arcsin 0.5P, where P is a value obtained by dividing a pixel pitch of the display panel imaged on pixels of the camera by a pixel pitch of the camera.

In the above embodiment, the display unevenness of the display panel is preferably measured in the unevenness measurement step after the spatial frequency component of the moire pattern in the captured image is removed using a low-pass filter.

In the above embodiment, the low-pass filter is preferably set to pass a frequency component in a region where the display unevenness is present.

In the above embodiment, an f-number of the lens of the camera is preferably set to be greater than or equal to 1.2 p/λ, where p represents the pixel pitch of the display panel imaged on pixels of the camera, and λ represents a wavelength of light incident to the camera.

An image quality adjustment circuit according to another embodiment of the present invention includes a storage unit configured to store correction data for correcting display unevenness of a display panel, the circuit being incorporated in the display panel. The correction data is generated based on measured display unevenness of an image of a test pattern image displayed on the display panel, the image of the test pattern image being captured using a camera positioned at a predetermined relative angle with respect to the display panel. The predetermined relative angle is set so that a spatial frequency component of a moire pattern occurring in the captured image is shifted out of a region where a spatial frequency component of the display unevenness is present, and an influence of the spatial frequency component of the moire pattern is thereby removed.

An image quality adjustment type display panel according to another embodiment of the present invention includes a display panel, and an image quality adjustment circuit including a storage unit configured to store correction data for correcting display unevenness of the display panel. The correction data is generated based on measured display unevenness of an image of a test pattern image displayed on the display panel, the image of the test pattern image being captured using a camera positioned at a predetermined relative angle with respect to the display panel. The predetermined relative angle is set so that a spatial frequency component of a moire pattern occurring in the captured image is shifted out of a region where a spatial frequency component of the display unevenness is present, and an influence of the spatial frequency component of the moire pattern is thereby removed.

In the above embodiment, as to the size of the display panel, the length of a diagonal of the display panel is preferably 40 inches or more.

DESCRIPTION OF THE PREFERRED EMBODIMENTS

Embodiments of the present invention will now be described in detail.

Figure 1:
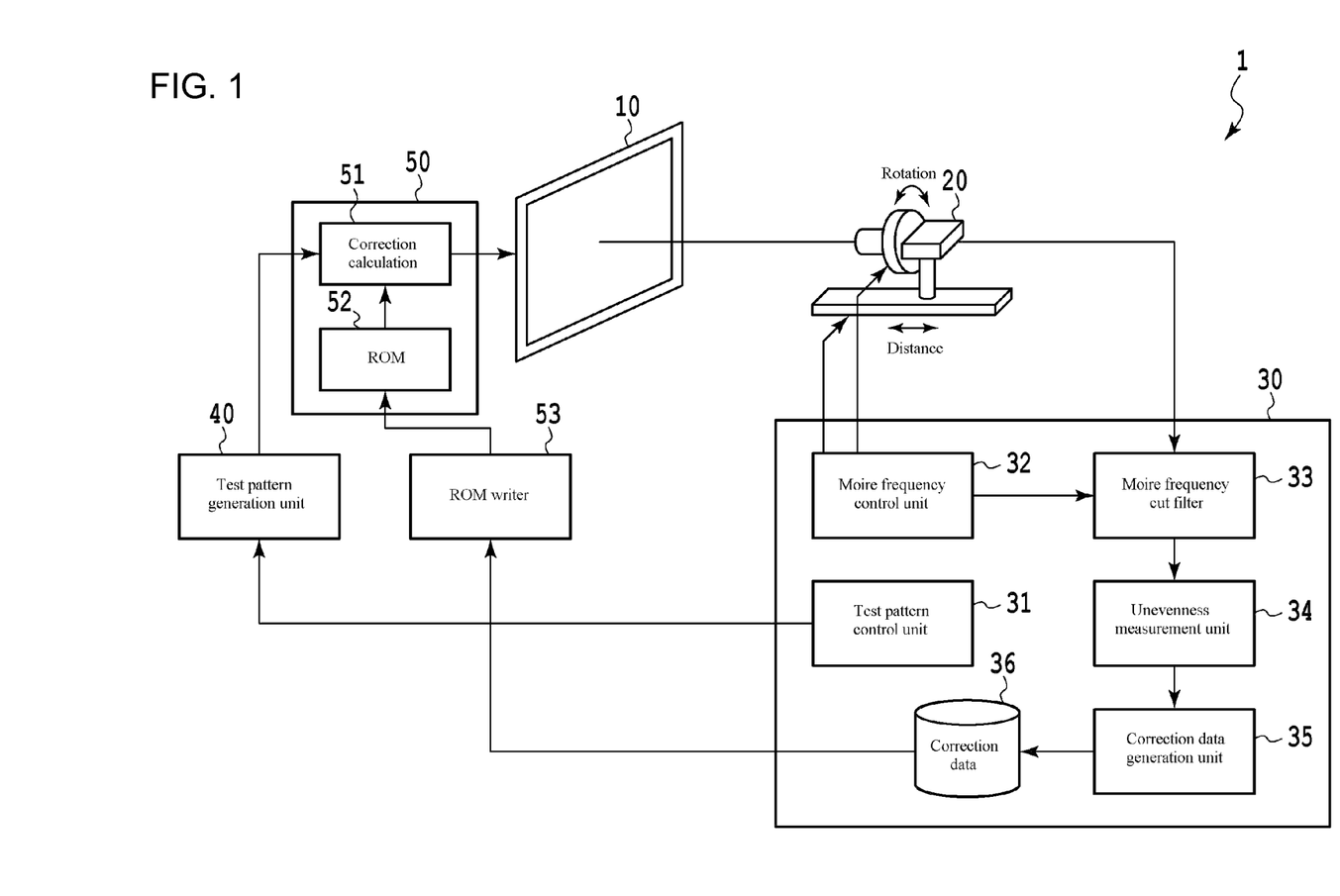
FIG. 1 is a diagram for describing an example of an image quality adjustment system employing an image quality adjustment apparatus according to an embodiment.

FIG. 1 is a diagram for describing an example of an image quality adjustment system employing an image quality adjustment apparatus according to this embodiment. As shown in FIG. 1, the image quality adjustment system 1 mainly includes a display panel 10 whose image quality is to be adjusted, a camera 20 that captures an image of the display panel 10 and obtains a captured image, an image quality adjustment apparatus 30 that controls the camera 20 so that the camera 20 captures an image, and measures display unevenness in the captured image to generate correction data, and a test pattern generation device 40 that generates a signal for causing the display panel 10 to display a test pattern image.

The image quality adjustment apparatus 30 of this embodiment measures unevenness in an image of a display state of the display panel 10 that is captured by the camera 20, and generates correction data for correcting display unevenness caused by manufacturing variations of the display panel 10. In the image quality adjustment system 1, the correction data is recorded by a ROM writer 53 to a ROM 52 of a correction circuit 50 included in the display panel 10 for image quality adjustment.

A specific example of the display panel 10 used in this embodiment may, for example, be a liquid crystal panel, organic EL panel, or the like, that displays an image based on an image signal, preferably a display panel that includes pixels that are arranged in a regular grid pattern. On the other hand, the camera 20 preferably employs an image capture means that captures an image using photodetector elements that are arranged in a regular grid pattern, such as a CCD or the like, because of its availability and applicability in manufacturing processes. When a camera including image capture elements arranged in a grid pattern is used to capture an image of a panel including pixels arranged in a grid pattern, a moire pattern occurs in the captured image. In this embodiment, a relative angle of rotation (relative angle) between the display panel 10 and the camera 20 is changed to shift spatial frequency components of only the moire pattern(s) to high frequency components in which the strength of the spatial frequency components of unevenness is small or the spatial frequency components of unevenness are not present, before an image of an output image of the display panel 10 is captured. As a result, the influence of interference between the uneven image and the moire pattern can be reduced or eliminated.

As described above, in this embodiment, the relative angle of rotation (relative angle) between the display panel 10 and the camera 20 is changed to shift spatial frequency components of only the moire pattern(s) to high frequency components in which the strength of the spatial frequency components of unevenness is small or the spatial frequency components of unevenness are not present, before an image of an output image of the display panel 10 is captured. Thereafter, only moire components are previously removed using, for example, a filter that cuts off high frequency components of the captured image. For the captured image from which moire components have been previously removed, unevenness is measured to generate correction data. As a result, correction data for accurately correcting unevenness can be generated without the influence of a moire pattern. Note that it is not essential to cut off the high frequency components.

As to the size of the display panel 10, the length of the diagonal of the display panel 10 is preferably 40 inches or more. In order to more effectively exhibit advantages of the present invention, the length of the diagonal of the display panel 10 is preferably 42 inches or more, more preferably 46 inches or more, even more preferably 50 inches or more, particularly preferably 55 inches or more, and most preferably 60 inches or more.

In this embodiment, an example will be described in which the relative angle of rotation (relative angle) between the display panel 10 and the camera 20 is changed by rotating the camera 20. Note that, in the present invention, only the relative angle between the display panel 10 and the camera 20 needs to be changed, and therefore, needless to say, for example, the display panel 10 may be rotated, or both the display panel 10 and the camera 20 may be rotated.

In FIG. 1, the camera 20 is installed so that the optical axis of the camera lens is perpendicular to the display panel 10, and is allowed to rotate around an axis perpendicular to the display panel 10. When the camera 20 is rotated, the relative angle of rotation (relative angle) between the camera 20 and the display panel 10 is changed. The relative angle when the horizontal line or vertical line of the camera 20 is parallel to the horizontal line of the display panel 10 is assumed to be zero. The axis of rotation ideally coincides with the optical axis of the camera lens. Nevertheless, if the axis of rotation is parallel to the optical axis of the camera lens, both of the two axes do not necessarily need to coincide with each other. The camera 20 is also allowed to move toward and away from the display panel 10. In other words, a distance between the camera 20 and the display panel 10 (the length of a perpendicular dropped from the camera 20 to the display panel 10) can be changed. Thus, by moving the camera 20 toward or away from the display panel 10, a relative distance between the camera 20 and the display panel 10 can be changed in order to change the ratio of the pixel pitch of the CCD to the pixel pitch of the display panel 10 imaged on the CCD. The direction of the movement is preferably perpendicular to the panel surface of the display panel 10.

The image quality adjustment apparatus 30 includes a test pattern control unit 31, a moire frequency control unit 32, a moire frequency cut filter 33, an unevenness measurement unit 34, a correction data generation unit 35, and a correction data storage unit 36.

The test pattern control unit 31 outputs a control signal that causes the test pattern generation device 40 to generate a test pattern. For example, the test pattern control unit 31 instructs the test pattern generation device 40 to output, as a test pattern signal, an 8-bit RGB signal that is to be displayed on the entire display panel 10.

The moire frequency control unit 32 measures the spatial frequency of a moire pattern, and controls the camera 20 so the camera 20 rotates and moves forward and backward, thereby changing the relative angle and relative distance between the display panel 10 and the camera 20. When the relative angle and relative distance between the display panel 10 and the camera 20 are changed, the spatial frequency of a moire pattern that appears in a captured image of the display panel 10 shifts. The moire frequency control unit 32 rotates the camera 20 by a predetermined angle before measuring unevenness, thereby shifting only moire components of the captured image to a relatively high frequency region.

The moire frequency cut filter 33 is a low-pass filter that performs filtering on an image captured by the camera 20. While the frequency of a moire pattern is shifted to a relatively high frequency region by the moire frequency control unit 32, a spatial frequency band in which unevenness is observed remains in a low frequency region, and therefore, only moire components of all frequency components of the captured image can be cut off. The moire frequency cut filter 33 may be configured as a digital filter including two filters, i.e., a filter that passes only horizontal frequency components lower than or equal to a predetermined frequency and a filter that passes only vertical frequency components lower than or equal to a predetermined frequency, so that only a spatial frequency band in which unevenness is observed is passed. For example, the moire frequency cut filter 33 may be set to pass horizontal frequency components with a frequency of 0 to ½ of the Nyquist frequency and vertical frequency components with a frequency of 0 to ½ of the Nyquist frequency.

The unevenness measurement unit 34 analyzes the captured image that has been passed through the moire frequency cut filter 33, to measure unevenness occurring on the display panel 10 and thereby obtain unevenness data. The technique of measuring unevenness is not particularly limited. For example, unevenness may be measured by obtaining a difference between a known test pattern image and the captured image.

The correction data generation unit 35 processes the measured unevenness data into a data format suitable for a correction calculation unit 51, to generate correction data for correcting display unevenness of the display panel 10. The correction data storage unit 36 is a device for storing the generated correction data, such as a hard disk or the like.

The ROM writer 53 is a device that writes the correction data stored in the correction data storage unit 36 to the ROM 52 of the correction circuit 50.

The correction circuit 50 includes the correction calculation unit 51 and the ROM 52. The correction calculation unit 51 is a circuit that calculates the amount of correction based on the correction data stored in the ROM 52, the RGB level of an input video (image signal), and the position where the video is displayed, and corrects the video (image) that is displayed on the display panel 10.

The test pattern generation device 40 is a video generation device that generates a test pattern that needs to be displayed on the display panel 10 during measurement of moire frequencies or unevenness, according to a control signal from the test pattern control unit 31. The test pattern generation device 40 generates a positioning pattern, raster (the same value is assigned to all pixels), and the like.

Note that, in this embodiment, the display panel 10 includes the correction circuit 50, the correction calculation unit 51, and the ROM 52. The ROM 52 initially has no recorded correction data. When correction data generated by the process of the image quality adjustment system 1 is recorded to the ROM 52, the production of the display panel 10 is completed. Although, in FIG. 1, the display panel 10 including the correction circuit 50, the correction calculation unit 51, and the ROM 52 is used, the display panel 10 may not include the correction circuit 50 or the correction calculation unit 51, and alternatively, after correction data is recorded to the ROM 52, the ROM 52 may be attached along with the correction circuit 50 and the correction calculation unit 51 to the display panel 10, for example.

Next, the process of the image quality adjustment system will be described. In this embodiment, unevenness is measured based on an image from which a moire pattern is previously removed. Therefore, the removal of a moire pattern will be firstly described.

Figure 2:
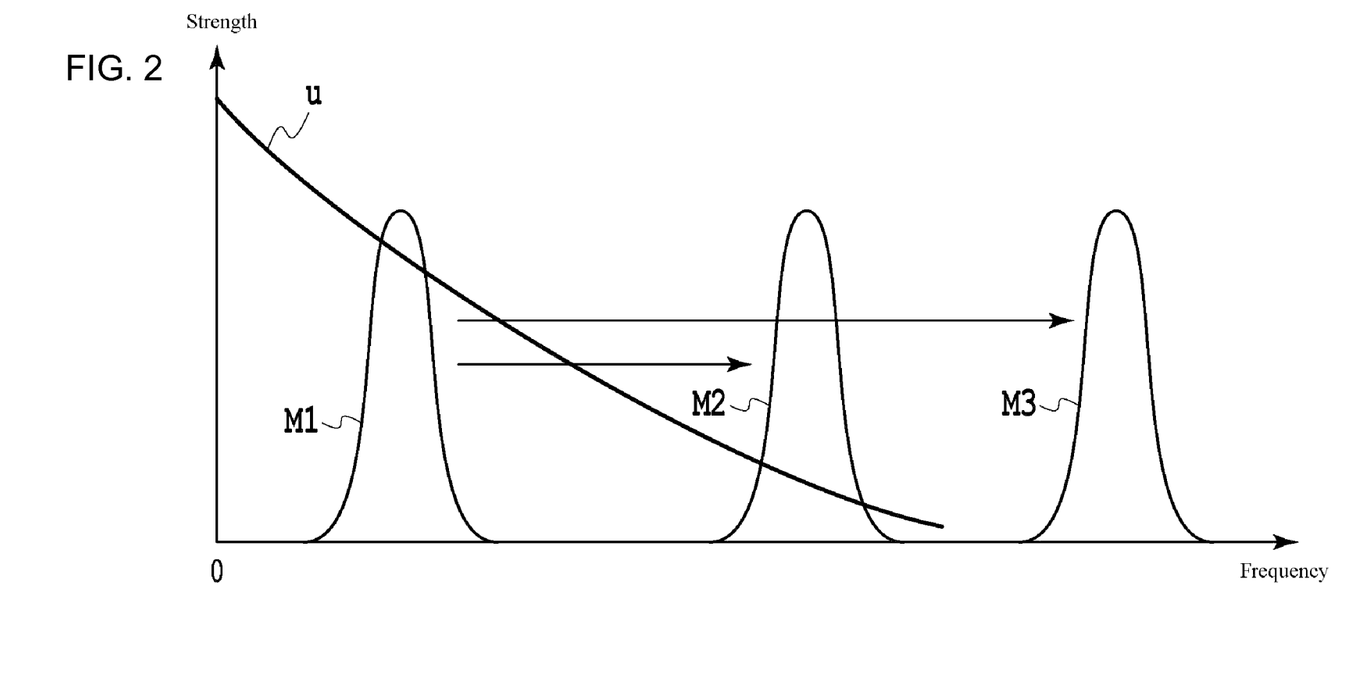
FIG. 2 is a diagram for describing separation of spatial frequencies of moire components from spatial frequencies of display unevenness by shifting the spatial frequencies of the moire components.
Figure 5:
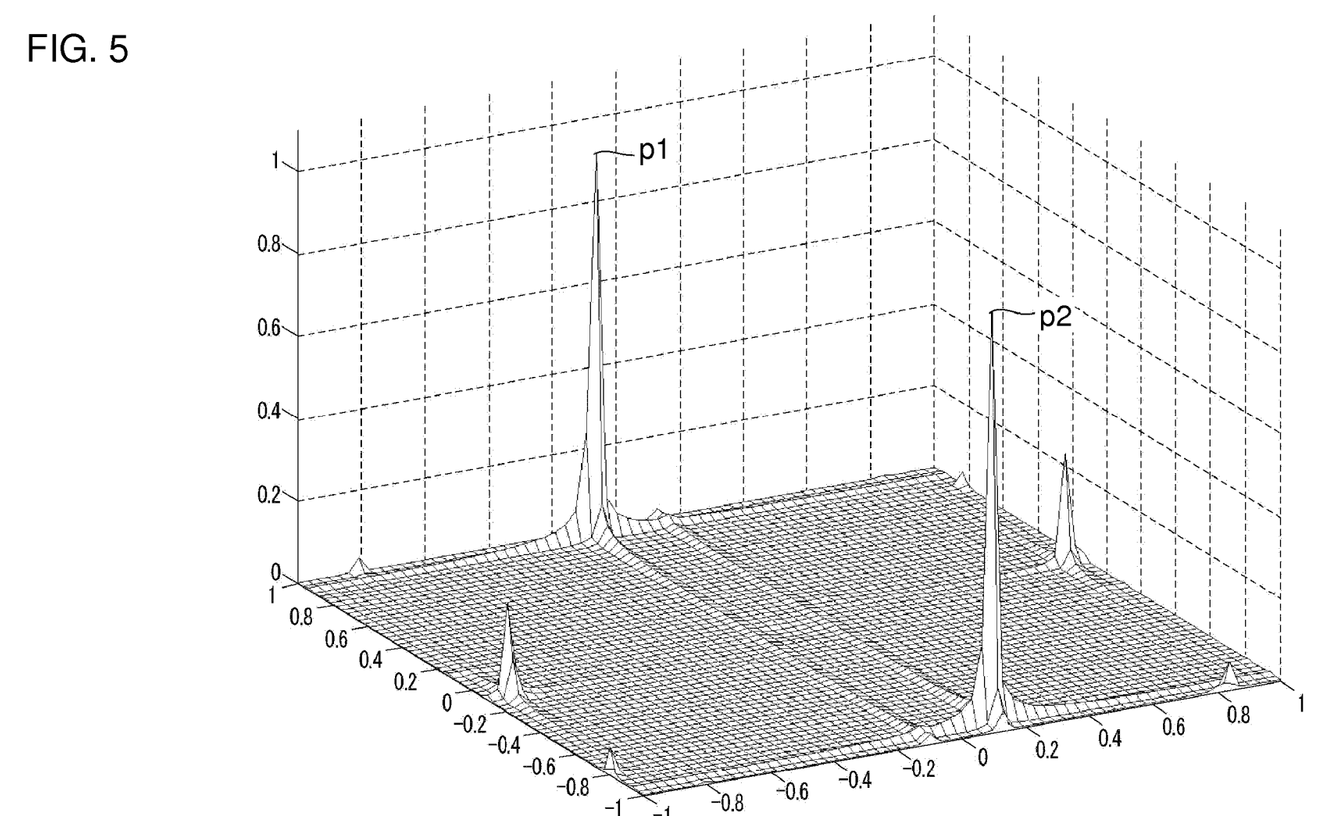
FIG. 5 is a diagram showing spatial frequency measurement data calculated based on a captured image.

FIG. 2 is a diagram for describing separation of spatial frequencies of moire components from spatial frequencies of display unevenness by shifting the spatial frequencies of the moire components. In FIG. 2, the horizontal axis represents frequencies, and the vertical axis represents signal strengths. A region surrounded by these axes and a curve "u" indicates spatial frequencies at which display unevenness components are present. Regions surrounded by respective curves M1 to M3 indicate spatial frequencies at which moire components are present at various relative angles. As shown in FIG. 5 described below, an image having display unevenness or a moire pattern is actually obtained by plotting signal strengths with respect to spatial frequencies of horizontal frequency components and vertical frequency components. Here, for the sake of simplicity, an example where the frequency is one dimensional will be described.

The display unevenness component has a frequency dependence as shown in FIG. 2. When the relative angle between the camera 20 and the display panel 10 is not adjusted, frequency components corresponding to a moire pattern are present in the frequency region M1 of FIG. 2, overlapping the strength of display unevenness. In this case, an image having the display unevenness and the moire pattern interfere with each other, and therefore, it is difficult to accurately measure the display unevenness. Therefore, the relative angle between the camera 20 and the display panel 10 is adjusted by rotating the camera 20 so that frequency components corresponding to the moire pattern are shifted from the frequency region M1 of FIG. 2 to the frequency region M2 or M3 of FIG. 2. The frequency region M1 results in the frequency region M2 of FIG. 2 by being shifted within the region where the spatial frequency components of the display unevenness are present. The frequency region M1 results in the frequency region M3 of FIG. 2 by being shifted so as to be out of the region where the spatial frequency components of the display unevenness are present.

The influence of the moire pattern on the image having the display unevenness can be reduced by shifting the moire components to the frequency region M2 of FIG. 2. Thereafter, if the moire components are removed by filtering, a portion of the frequency components of the image having the display unevenness is simultaneously removed, but this influence is small. Therefore, an image having display unevenness from which a moire pattern is satisfactorily removed can be obtained.

On the other hand, when the moire components are shifted to the frequency region M3 of FIG. 2, the moire components are located out of the frequency region of the image having the display unevenness, and therefore, the influence of the moire pattern on the image having the display unevenness can be removed. Thereafter, if the moire components are removed by filtering, the image having the display unevenness from which the moire pattern is removed can be obtained without influencing the image having the display unevenness.

Figure 3:
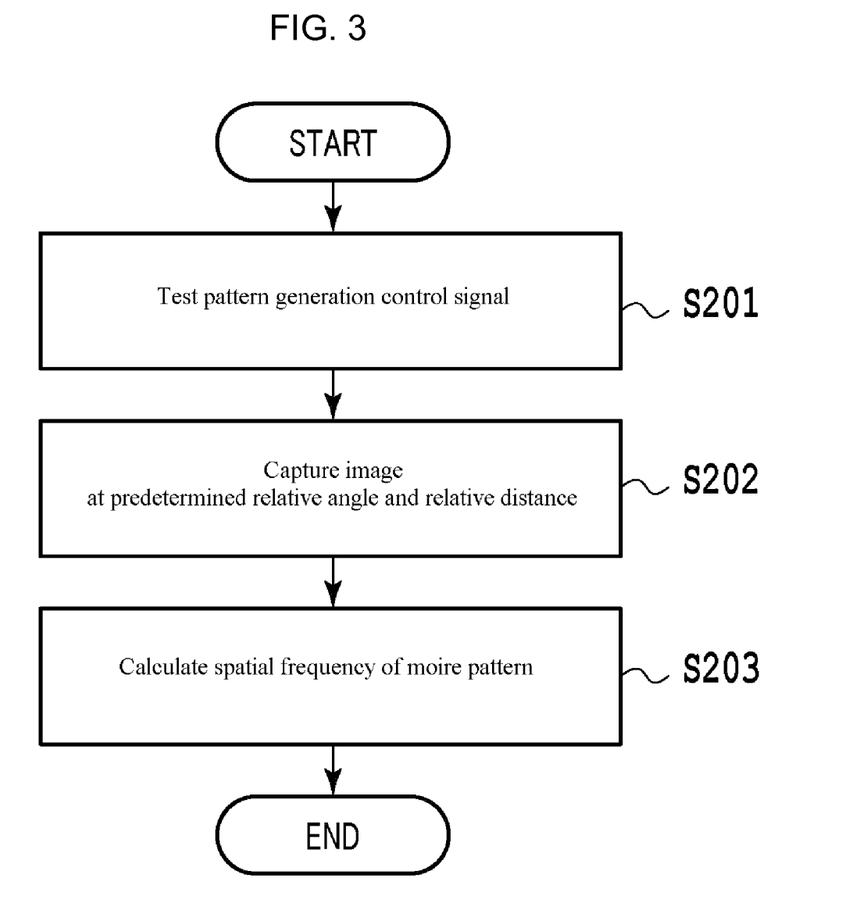
FIG. 3 is a flowchart showing a process flow of a technique of measuring the spatial frequency of a moire pattern in the image quality adjustment apparatus.

The following is a more detailed description of the removal of a moire pattern. Specifically, a technique of measuring the spatial frequency of a moire pattern in order to remove the moire pattern will be described. FIG. 3 is a flowchart showing a process flow of the technique of measuring the spatial frequency of a moire pattern in the image quality adjustment apparatus.

The test pattern control unit 31 inputs a control signal for generating a test pattern signal to the test pattern generation device 40 (S201). When the test pattern generation device 40 inputs a test pattern signal to the correction circuit 50 attached to the display panel 10, a test pattern image is displayed on the display panel 10.

Figure 4:
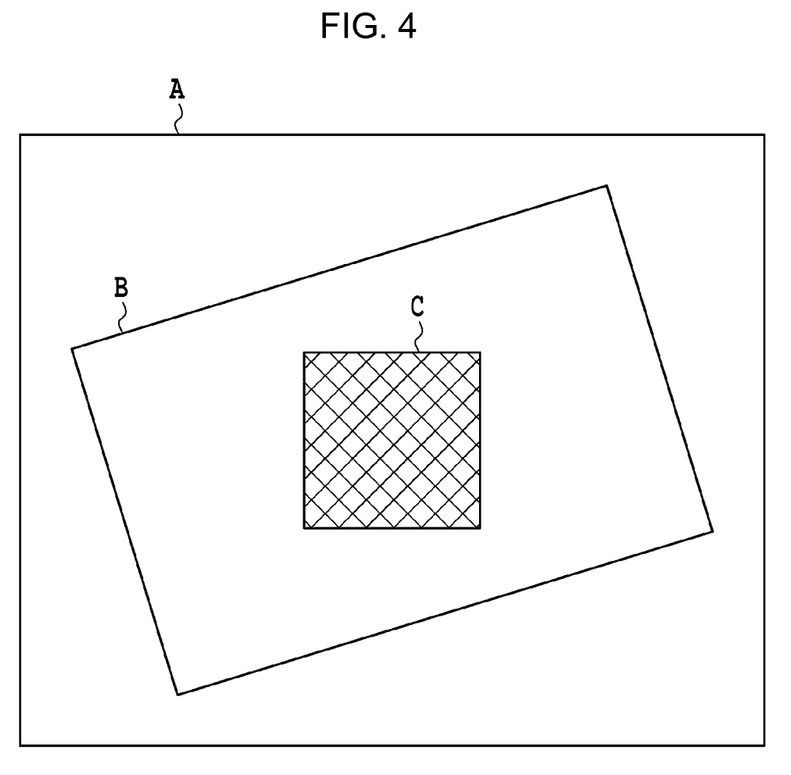
FIG. 4 is a diagram showing an image captured by a rotated camera.

On the other hand, the moire frequency control unit 32 moves the camera 20 by a predetermined relative angle and relative distance, and captures an image of a test pattern image displayed on the display panel 10 and obtains a captured image (S202). When image capture is performed using the rotated camera, a captured image, such as that shown in FIG. 4, is obtained. In FIG. 4, an outermost perimeter portion A indicates an entire image captured by the camera 20, and an inner slanting rectangle B indicates the display range of the panel 10. Note that a center hatched square portion C indicates a range in which a moire pattern is measured. An image of the display panel 10 is captured after the relative distance between the display panel 10 and the camera 20 has been adjusted so that the entire display panel 10 is included within the range of an image captured by the camera 20 as shown in FIG. 4. The predetermined relative angle and relative distance in this case are temporarily stored in a storage means (not shown) in association with the captured image.

When the captured image is obtained as a result of the image capture, the moire frequency control unit 32 calculates the spatial frequency of a moire pattern based on the captured image (S203). The spatial frequency of a moire pattern may be calculated based on a captured image of a portion of the panel 10 that is represented by the hatched portion C of FIG. 4. This is because although a moire pattern occurs substantially uniformly throughout the captured image of the display panel 10, the spatial frequency of the moire pattern is substantially uniform throughout the screen due to the uniform pixel pitch (element pitch) of the CCD and the uniform pixel pitch (element pitch) of the panel 10. Specifically, if the relative angle is zero, a major component of the lattice pattern of the panel lattice occurs at a spatial frequency $f=1/P$, where the pixel pitch of the CCD is 1, and the pixel pitch of an image of the display panel 10 formed on the CCD is P. This is because each pixel of the display panel 10 typically has an RGB light emitting unit, and therefore, the display pixel 10 has RGB stripes, a boundary portion between each pixel does not emit light, etc. The moire pattern measurement range may be set to fall within the panel display range by adjusting the angle of rotation or the image capture distance.

FIG. 5 is a diagram showing spatial frequency measurement data calculated based on a captured image. The spatial frequency of FIG. 5 is measured by the process of S203 of the moire frequency control unit 32. The spatial frequency measurement data of FIG. 5 is obtained by performing a two-dimensional Fourier transform on data of the extracted moire pattern measurement range. In FIG. 5, spatial frequencies of horizontal frequency components and vertical frequency components are plotted on the x axis and the y axis, and the magnitude (power) of a component of a captured image at each spatial frequency is shown in the z-axis direction. As shown in FIG. 5, the captured image has sharp spatial frequency peaks p1 and p2. The peaks p1 and p2 appear at spatial frequencies of a moire pattern. Therefore, by examining the locations of the peaks, spatial frequencies of a moire pattern can be measured.

It is considered that if unevenness having a certain spatial frequency component occurs significantly, a two-dimensionally Fourier transformed version of the unevenness component also appears as a sharp peak, and therefore, the unevenness cannot be distinguished from a moire pattern. However, such a panel can be easily visually recognized, and therefore, may not be used for measurement of the spatial frequency of a moire pattern. The spatial frequency of the moire pattern thus measured occurs at the same location in panels of the same type if image capture is conducted using the same camera 20 under the same image capture conditions (the angle and distance). It is sufficient to conduct the measurement once, and the measurement is not required each time, unless the image capture conditions are changed.

As described above, the spatial frequency of a moire pattern can be measured using the processing technique of FIG. 3. When the relative angle and the relative distance are changed, the spatial frequency of a moire pattern appearing in a captured image is shifted. If the process of FIG. 3 is performed a predetermined number of times while the relative angle and the relative distance are successively changed, the relative angle and the relative distance that maximize the spatial frequency of a moire pattern that has a spatial frequency closest to zero are specified as conditions under which the spatial frequency of the moire pattern can be separated from the spatial frequency of unevenness. Under the specified image capture conditions, a moire pattern that is a continuous fine pattern caused by a mismatch in pitch between the display panel and the camera is mainly measured as high frequency components. On the other hand, display unevenness caused by manufacturing variations of the display panel changes gradually, and is mainly measured as low frequency components. Therefore, if the spatial frequency of a moire pattern that has a spatial frequency closest to zero is maximized to be located far away from direct current components, the moire pattern can be more reliably separated from unevenness.

The following is a more detailed description of the technique of specifying the relative angle and relative distance that maximize the spatial frequency of a moire pattern that has a spatial frequency closest to zero.

When the relative distance between the display panel 10 and the camera 20 is changed, a change occurs in the horizontal frequency components of the spatial frequency of a moire pattern occurring in an image of the display panel 10 that is captured by the camera 20. On the other hand, the relative angle between the display panel 10 and the camera 20 is changed, a change occurs in the horizontal and vertical frequency components of the spatial frequency of a moire pattern occurring in an image of the display panel 10 that is captured by the camera 20. The reason for this will be described using a two-dimensional frequency plane.

Figure 6:
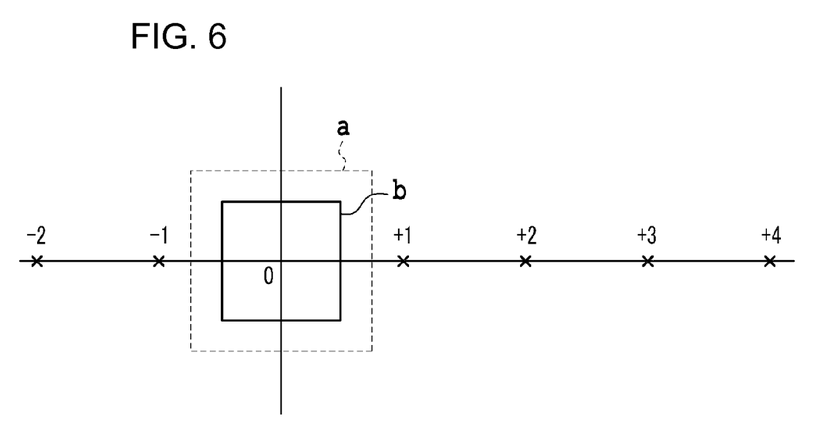
FIG. 6 is a diagram showing frequency components of vertical stripes of a horizontal RGB arrangement that cause a moire pattern.

As an example, a case where the vertical stripes of the horizontal RGB arrangement that cause a moire pattern have frequency components as shown in FIG. 6, will be described. In FIG. 6, the horizontal axis represents spatial frequency components (horizontal frequency components) of the vertical stripes, and the vertical axis represents spatial frequency components (vertical frequency components) of the horizontal stripes. The locations of x indicate frequency components of a moire pattern, where up to fourth harmonics (+1 to +4) are shown. Harmonics higher than the fourth harmonic exceed the resolution of an optical lens system, and therefore, the amplitudes thereof are not substantially measured. In FIG. 6, a Nyquist frequency that is determined by the pixel pitch of the CCD is indicated by a dotted line "a," and a region in which frequency components of unevenness may be present is indicated as a region surrounded by a solid line "b."

Figure 7:
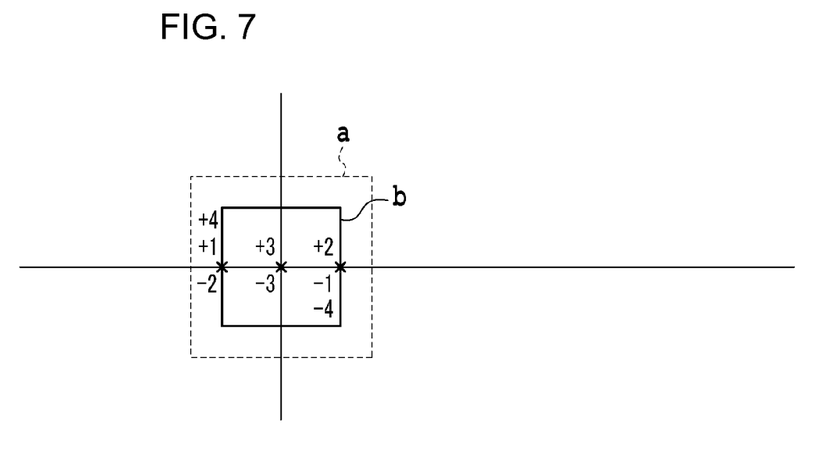
FIG. 7 is a diagram showing locations that are actually observed when harmonic components are aliased at a Nyquist frequency.

The frequency components of a moire pattern shown in FIG. 6 are actually observed as frequency components at locations aliased at the Nyquist frequency indicated by the dotted line "a" for the harmonic components at the locations of x indicated by +1 to +4. FIG. 7 shows locations where the results of the aliasing of the harmonic components at the Nyquist frequency are actually observed. The symbols x that coincide with the solid line "b" of FIG. 7 and the symbol x that coincides with the origin (direct current component) indicate moire components that are present in the region "b" where frequency components of unevenness may be present. If moire components are present in the region "b" where frequency components of unevenness may be present, the moire components cannot be separated from an image having unevenness using a low-pass filter or the like. Therefore, in this embodiment, the spatial frequency of a moire pattern is shifted by changing the relative angle as described below.

Figure 8:
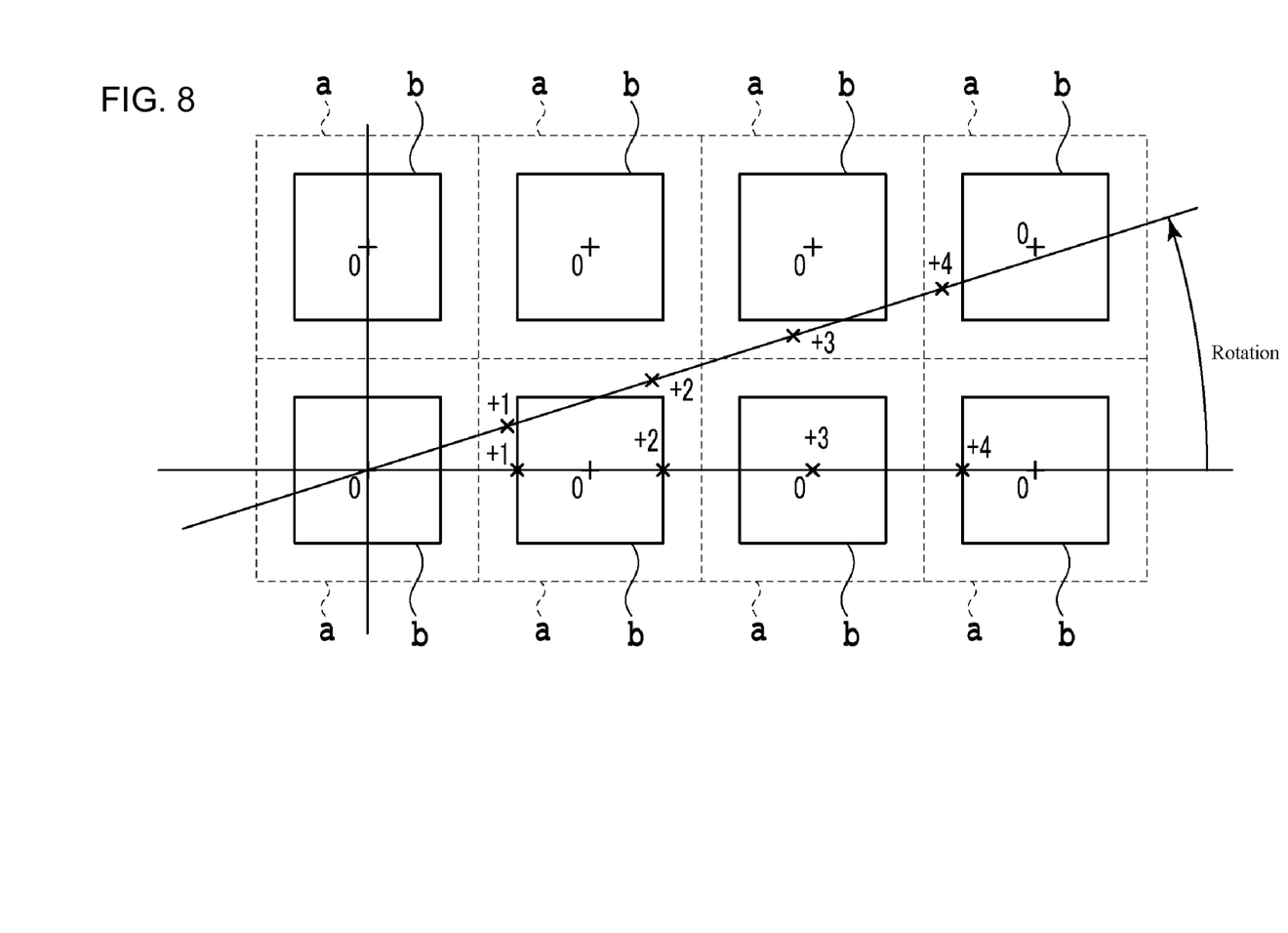
FIG. 8 is a diagram showing a case where the frequency components of FIG. 7 are not aliased.

For ease of description of a change in the spatial frequency due to a change in the relative angle, FIG. 8 is a modified version of FIG. 7 that clarifies a relationship between the dotted line "a" and the solid line "b," and actually observed frequency components of a moire pattern. In FIG. 8, a region surrounded by a plurality of dotted lines "a" and a region surrounded by a plurality of solid lines "b" are shown, indicating a region of FIG. 7 in which a spatial frequency component indicated at each location is observed due to aliasing.

When the camera is rotated in order to change the relative angle between the camera and the panel, frequencies on the frequency plane are also rotated by the same angle. Because a moire pattern typically occurs as vertical stripes, the frequency components of a moire pattern are located on the horizontal axis of the frequency plane as shown in FIG. 8 when the relative angle between the display panel and the camera is zero. Therefore, the frequency components of the moire pattern are aliased at the Nyquist frequency "a," so that the frequency components of the moire pattern are observed in a region surrounded by the solid line "b" in which spatial frequency components of unevenness may be present. In this situation, it is difficult to separate the frequency of unevenness from the frequency of the moire pattern using a filter to remove the moire pattern. Therefore, the camera or the display panel is rotated to change the relative angle so that the spatial frequency components of the moire pattern move around the origin (direct current component). This is because an image of a moire pattern that occurs as vertical stripes in the display panel is captured by the camera as slanting stripes due to a change in the relative angle between the camera and the display panel.

More specifically, when the spatial frequency of the panel lattice is f>0.5, a moire pattern occurs at low frequency components due to aliasing at the Nyquist frequency. When the camera 20 is rotated by θ with respect to the display panel 10, the spatial frequency of the panel lattice is also rotated by θ. Therefore, if θ is adjusted so that the spatial frequency of the panel lattice is located on the Nyquist frequency, an image that is free from a moire pattern over a wide frequency range is conveniently obtained. An optimum angle of rotation (relative angle) is $\arcsin(0.5 \times P)$.

Thus, if the camera 20 is rotated to adjust the slant of a captured image, a change occurs in the horizontal and vertical frequency components of the spatial frequency of a moire pattern aliased at the aliasing spatial frequency (Nyquist frequency) specific to the camera. Therefore, by adjusting the angle of rotation, the horizontal and vertical frequency components of the spatial frequency of a moire pattern aliased at the aliasing frequency can be shifted to an observation location that is as far away from the direct current component as possible. On the other hand, display unevenness that occurs due to manufacturing variations of the display panel changes gradually, and the frequency of the unevenness does not include a harmonic component, and is present only in the region surrounded by the solid line "b" that is close to the origin, and therefore, even if the camera is rotated, does not substantially change.

As described above, when the relative angle is changed, only frequency components of a moire pattern are shifted to a high frequency region, and therefore, the spatial frequency of a moire pattern that has a spatial frequency closest to zero can be changed by changing the relative angle. Therefore, images are captured at a plurality of image capture positions having different relative angles, frequency components of a moire pattern are measured in each of the captured images, and the relative angle at which a capture image that maximizes the spatial frequency of a moire pattern that has a spatial frequency closest to zero is obtained is specified as a condition under which the spatial frequency of the moire pattern can be separated from the spatial frequency of unevenness. A region that includes frequency components lower than the frequency component of a moire pattern having a spatial frequency closest to zero can be specified as a region surrounded by a quadrangle that is perpendicular to each of the vertical and horizontal axes of the spatial frequency coordinates. Therefore, the spatial frequency of a moire pattern that has a spatial frequency closest to zero is specified to be maximized when the area of the quadrangle is maximum.

Moreover, if the distance (relative distance) between the camera and the display panel is changed to enlarge or reduce a video, the relationship between the Nyquist frequency and the frequency of a moire pattern changes as a result of the change in distance, so that a change occurs in the interval between each of the moire pattern frequencies that are indicated by the symbols x equally spaced in FIG. 8. However, if only this technique is used, a symbol x falls into one of the square regions indicated by a solid line, and therefore, a moire pattern cannot be shifted out of the video region "b." For example, if the distance between the display panel and the camera is increased so that the symbol x (+3) is moved to the right, the symbol x (+4) enters a square range. Conversely, when the symbol x (+3) is moved to the left, the symbol x (+2) enters a square range. Therefore, if the relative distance between the camera and the display panel is changed in addition to changing the relative angle between the camera and the display panel, the frequency component of a moire pattern having a spatial frequency closest to zero can be more finely set.

When all frequency components of a moire pattern are located farther from the origin than the solid line "b" of FIG. 8, the frequency components of the moire pattern are not present in the region where the frequency components of unevenness may be present. In this situation, if filtering is performed on a captured image using a low-pass filter that passes only frequency components that are located inside the solid line "b," the moire pattern can be completely removed. In other words, in addition to the main component of the panel lattice, harmonic components having a spatial frequency that is an integral multiple of the main component, that have a low amplitude, are present. These harmonic components may be aliased at the Nyquist frequency, so that a moire pattern may occur in a low frequency region. Therefore, by cutting off these harmonic components using a low-pass filter, the moire pattern is removed.

Alternatively, instead of a low-pass filter (or with a low-pass filter), a diffraction blur of light may be caused to occur, and spatial frequencies higher than the shape (airy disk) of the blur may be cut off. When the lens diaphragm of the camera 20 is narrowed to increase the f-number, high frequencies are cut off as with a high-quality low-pass filter, and therefore, the lattice pattern of the panel imaged on the CCD can be optically removed. The f-number is determined by the wavelength $\lambda$ of light incident to the lens and the pixel pitch p of the CCD, and is optimized when the maximum resolution determined by the airy disk is equal to p, and therefore, $F=1.22 \times p/\lambda$, is most desirable. When the f-number is smaller than $1.22 \times p/\lambda$, a moire pattern cannot be sufficiently removed. Therefore, the f-number is preferably greater than or equal to $1.2 \times p/\lambda$.

As described above, if the position of the camera 20 is set to the relative angle and relative distance that maximize a region where frequency components of a moire pattern are not present, only moire components can be separated from video components including unevenness using a low-pass filter that passes only components in a region where frequency components of unevenness are present, or a diffraction blur.

Thus, if the size and slant of a captured image are adjusted to shift moire components to a high frequency component region, a video signal for generating unevenness correction data extending over a wide range from the direct current can be obtained by processing the captured image using a low-pass filter or the like.

Figure 9:
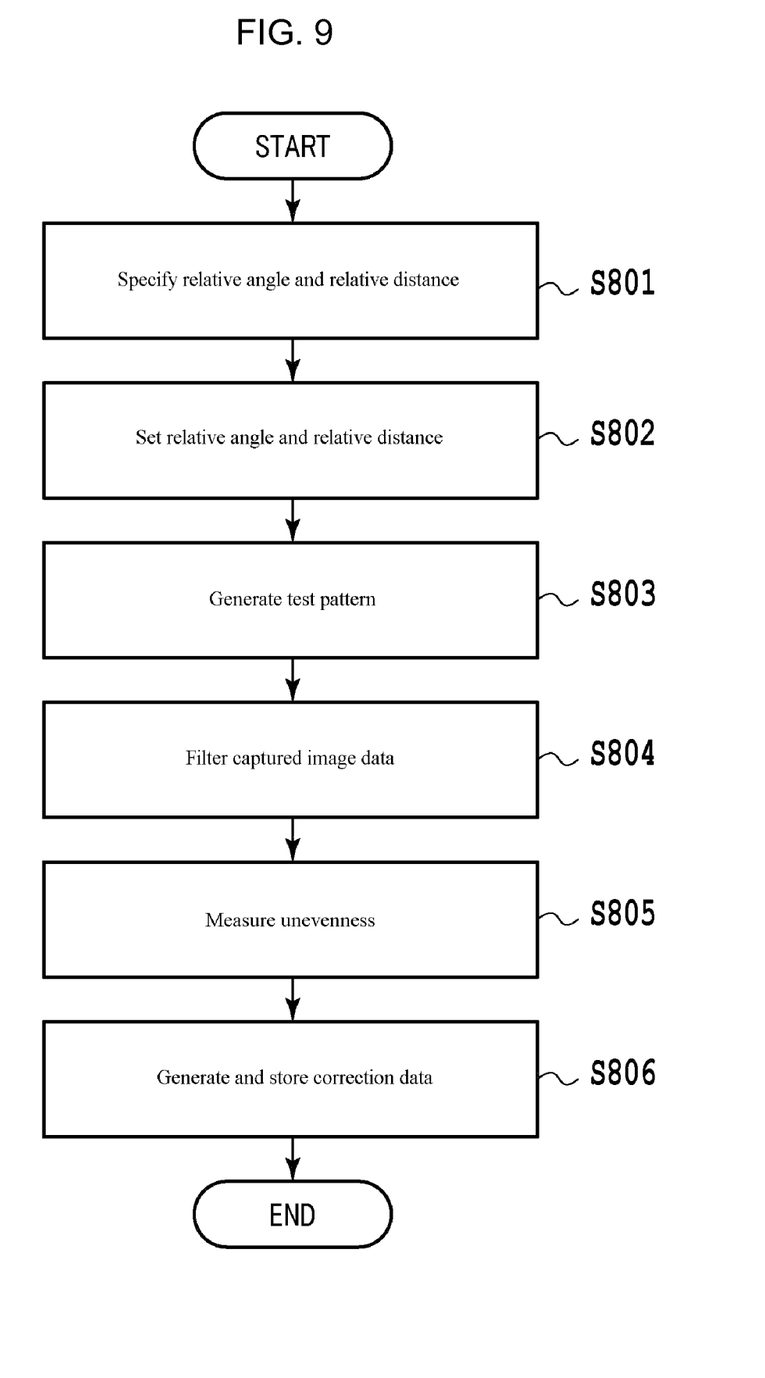
FIG. 9 is a diagram showing a flow of a process of generating correction data for a captured image.

Next, a process of generating correction data for a captured image that has been adjusted using the relative angle and relative distance specified by the above process, will be described with reference to FIGS. 1 and 9.

The moire frequency control unit 32 specifies a relative angle and relative distance that are to be set, based on the panel type (S801). For example, the values of the relative angle and relative distance to be set, that have been previously specified by measuring the spatial frequency of a moire pattern by the process of FIG. 3 for each panel type, are stored. When the type of a panel to be measured is input, corresponding values are extracted from a storage unit (not shown).

The moire frequency control unit 32 moves and sets the camera 20 to a specified relative angle and relative distance (S802). The relative angle and the relative distance are set to those that maximize the spatial frequency of a moire pattern that has a spatial frequency closest to zero, in a captured image. Note that, in S801 and S802, only the relative angle may be specified and set.

The test pattern control unit 31 sends a control signal for generating a test pattern to the test pattern generation device 40 (S803). The test pattern generation device 40, when receiving the control signal, inputs a signal for causing the display panel 10 to display a test pattern image to the correction circuit 50. When the test pattern signal is input to the correction circuit 50, a test pattern image is displayed on the display panel 10.

When a test pattern image is displayed on the display panel 10, an image of the test pattern image displayed on the display panel 10 is captured by the camera 20, and then input to the image quality adjustment apparatus 30, and thereafter, the moire frequency cut filter 33 performs filtering on the captured image (S804), and then inputs the resultant captured image to the unevenness measurement unit 34. The moire frequency cut filter 33, which is a low-pass filter, passes components of a spatial frequency band observed as unevenness, and therefore, inputs a captured image from which moire components have been filtered out to the unevenness measurement unit 34.

The unevenness measurement unit 34, when receiving the filtered captured image, performs unevenness measurement (S805), and then sends unevenness data obtained as a result of the unevenness measurement to the correction data generation unit 35. The correction data generation unit 35 generates correction data based on the unevenness data, and stores the generated correction data to the correction data storage unit 36 (S806).

The ROM writer 53 writes the correction data to the ROM 52 of the correction circuit 50 of the display panel 10 after inspection.

By the above process, correction data for removing unevenness can be generated without the influence of moire components. A correction circuit (image quality adjustment circuit) including correction data generated by the above process, can adjust the RGB of display data based on the correction data, which is free from the influence of moire components, thereby generating a display signal whose image quality has been adjusted to a higher level. Moreover, a display apparatus including this correction circuit can adjust the RGB of display data based on correction data that is free from an influence of moire components, thereby providing a display whose image quality has been adjusted to a higher level.

In the foregoing embodiment, the correction circuit is incorporated into a display panel in advance before the following steps: a test is conducted while the correction function of the correction circuit is off, to generate correction data for the display panel; the generated correction data is written to the correction circuit; the correction function of the correction circuit is turned on; and the correction circuit is incorporated into the display panel before the shipment of the product. However, the correction circuit may not be previously incorporated into a display panel, and only needs to be incorporated into the display panel before the shipment of the product.

The display panel is not particularly limited. Any display panel that includes pixels arranged in a regular grid pattern may be employed. Similarly, the camera is not particularly limited. Any camera that has image capture elements, such as CMOSs, arranged in a regular grid pattern, instead of a CCD, may be employed.

In the foregoing embodiment, the camera is rotated in the drawings. Alternatively, the camera may be fixed, and the panel may be rotated. In this case, although the center of rotation is ideally the center of the panel, the center of rotation does not necessarily need to be the center of the panel.

In the foregoing embodiment, the relative distance is changed by changing the distance between the panel and the camera. The technique of changing the relative distance is not limited to this. Alternatively, the relative distance may be substantially changed by changing the magnification using a zoom lens. When zooming is used, it is not necessary to change the distance between the panel and the camera.

In the foregoing embodiment, the technique of removing the spatial frequencies of moire components that have been shifted, using a low-pass filter or a diffraction blur, has been illustrated. The technique of removing the shifted moire components is not limited to this. For example, a spatial frequency component corresponding to a moire component may be removed with pinpoint accuracy using a two-dimensional filter.

LIST OF REFERENCE CHARACTERS

1 Image quality adjustment system
10 Display panel
20 Camera
30 Image quality adjustment apparatus
31 Test pattern control unit
32 Moire frequency control unit
33 Moire frequency cut filter
34 Unevenness measurement unit
35 Correction data generation unit
36 Correction data
40 Test pattern generation unit
50 Correction circuit
51 Correction calculation
52 ROM
53 ROM writer

What is claimed is:

1. An image quality adjustment apparatus for obtaining correction data for correcting display unevenness of a display panel by capturing an image of the display panel using a camera, comprising:
  a test pattern signal control unit configured to generate a test pattern signal for causing the display panel to display a test pattern image;
  a relative position control unit configured to perform a control so that the display panel and the camera are positioned at a predetermined relative angle with respect to each other;
  an unevenness measurement unit configured to measure the display unevenness of the display panel based on image data captured by the camera; and
  a correction data generation unit configured to generate correction data for correcting the display unevenness of the display panel based on the display unevenness measured by the unevenness measurement unit,
  wherein when an image of the test pattern image displayed on the display panel is captured by the camera, the display panel and the camera are arranged at a predetermined relative angle with respect to each other so that a spatial frequency component of a moire pattern occurring in the captured image is shifted out of a region where a spatial frequency component of the display unevenness is present, and an influence of the spatial frequency component of the moire pattern is thereby removed.

2. The image quality adjustment apparatus according to claim 1, wherein
  the relative position control unit sets a relative distance between the display panel and the camera to a predetermined value.

3. The image quality adjustment apparatus according to claim 1, wherein
  the predetermined relative angle is substantially equal to arcsin 0.5P, where P is a value obtained by dividing a pixel pitch of the display panel imaged on pixels of the camera by a pixel pitch of the camera.

4. The image quality adjustment apparatus according to claim 1, further comprising:
  a low-pass filter configured to remove a high frequency component of the image captured by the camera,
  wherein the spatial frequency component of the moire pattern is removed by the low-pass filter.

5. The image quality adjustment apparatus according to claim 4, wherein
  the low-pass filter is set to pass a frequency component of a region in which the display unevenness is present.

6. The image quality adjustment apparatus according to claim 1, wherein
  focal ratio of the lens of the camera is set to be greater than or equal to 1.2 $p/\lambda$ so that the spatial frequency component of the moire pattern is removed, where p represents the pixel pitch of the display panel imaged on pixels of the camera, and $\lambda$ represents a wavelength of light incident to the camera.

7. A method for obtaining correction data for correcting display unevenness of a display panel by capturing an image of the display panel using a camera, comprising:
  a test pattern image display step of causing the display panel to display a test pattern image;
  a test pattern image capture step of capturing an image of the test pattern image displayed in the test pattern image display step using a camera positioned at a predetermined relative angle with respect to the display panel;
  an unevenness measurement step of measuring the display unevenness of the display panel based on the image of the test pattern image captured in the test pattern image capture step; and
  a correction data generation step of generating the correction data for correcting the display unevenness of the display panel based on the display unevenness measured in the unevenness measurement step,
  wherein the predetermined relative angle is set so that a spatial frequency component of a moire pattern occurring in the captured image is shifted out of a region where a spatial frequency component of the display unevenness is present, and an influence of the spatial frequency component of the moire pattern is thereby removed.

8. The method according to claim 7, wherein
  in the test pattern image capture step, a relative distance between the display panel and the camera is set to a predetermined value.

9. The method according to claim 7, wherein
  the predetermined relative angle is substantially equal to arcsin 0.5P, where P is a value obtained by dividing a pixel pitch of the display panel imaged on pixels of the camera by a pixel pitch of the camera.

10. The method according to claim 7, wherein
  after the spatial frequency component of the moire pattern in the captured image is removed using a low-pass filter, the display unevenness of the display panel is measured in the unevenness measurement step.

11. The method according to claim 10, wherein
the low-pass filter is set to pass a frequency component in a region where the display unevenness is present.

12. The method according to claim 7, wherein
focal ratio of the lens of the camera is set to be greater than or equal to 1.2 p/λ, where p represents the pixel pitch of the display panel imaged on pixels of the camera, and λ represents a wavelength of light incident to the camera.

13. A method for producing an image quality adjustment type display panel including a display panel and an image quality adjustment circuit including a storage unit for storing correction data for correcting display unevenness of the display panel, comprising:
   a test pattern image display step of causing the display panel to display a test pattern image;
   a test pattern image capture step of capturing an image of the test pattern image displayed in the test pattern image display step using a camera positioned at a predetermined relative angle with respect to the display panel;
   an unevenness measurement step of measuring the display unevenness of the display panel based on the image of the test pattern image captured in the test pattern image capture step;
   a correction data generation step of generating the correction data for correcting the display unevenness of the display panel based on the display unevenness measured in the unevenness measurement step;
   a correction data storage step of storing the correction data generated in the correction data generation step to the storage unit; and
   an image quality adjustment circuit incorporation step of incorporating the image quality adjustment circuit into the display panel so that the image quality adjustment circuit corrects an input signal to the display panel based on the correction data stored in the storage unit so as to correct the display unevenness of the display panel, wherein
the predetermined relative angle is set so that a spatial frequency component of a moire pattern occurring in the captured image is shifted out of a region where a spatial frequency component of the display unevenness is present, and an influence of the spatial frequency component of the moire pattern is thereby removed.

14. The method according to claim 13, wherein
in the test pattern image capture step, a relative distance between the display panel and the camera is set to a predetermined value.

15. The method according to claim 13, wherein
the predetermined relative angle is substantially equal to arcsin 0.5P, where P is a value obtained by dividing a pixel pitch of the display panel imaged on pixels of the camera by a pixel pitch of the camera.

16. The method according to claim 13, wherein
after the spatial frequency component of the moire pattern in the captured image is removed using a low-pass filter, the display unevenness of the display panel is measured in the unevenness measurement step.

17. The method according to claim 16, wherein
the low-pass filter is set to pass a frequency component in a region where the display unevenness is present.

18. The method according to claim 13, wherein
focal ratio of the lens of the camera is set to be greater than or equal to 1.2 p/λ, where p represents the pixel pitch of the display panel imaged on pixels of the camera, and λ represents a wavelength of light incident to the camera.

* * * * *